UNITED STATES PATENT OFFICE.

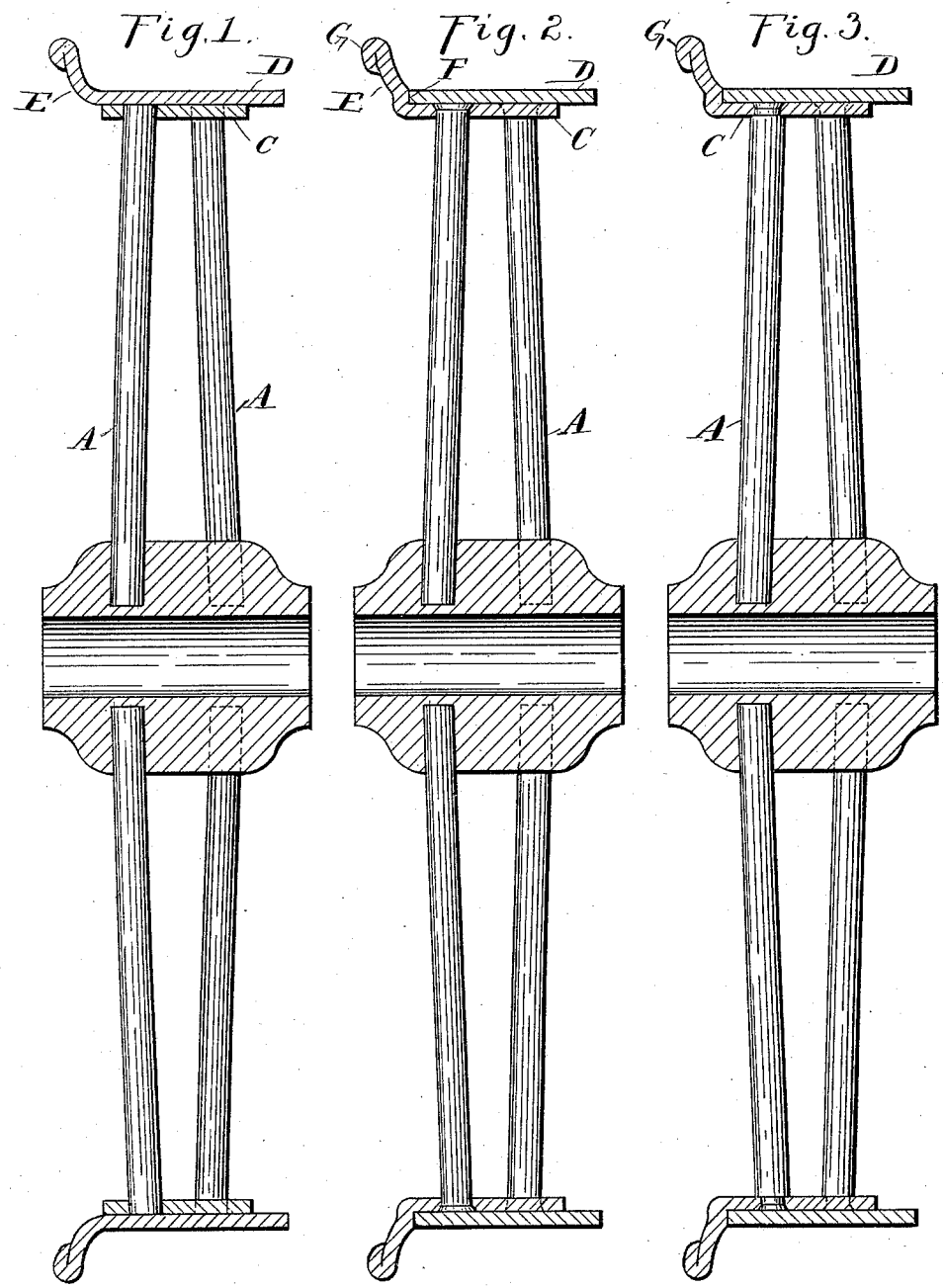

CYRUS ROBERTS, OF THREE RIVERS, MICHIGAN.

CAR-WHEEL.

SPECIFICATION forming part of Letters Patent No. 430,886, dated June 24, 1890.

Application filed May 1, 1890. Serial No. 350,175. (No model.)

*To all whom it may concern:*

Be it known that I, CYRUS ROBERTS, a citizen of the United States, residing at Three Rivers, in the county of St. Joseph and State of Michigan, have invented certain new and useful Improvements in Car-Wheels, of which the following is a specification, reference being had therein to the accompanying drawings.

This invention relates to new and useful improvements in car-wheels; and the invention has special reference to the construction of the lighter class of car-wheels especially used for hand-cars and other light railway-vehicles.

My invention consists in the improved construction of a metal wheel, as hereinafter more fully described, and shown in the accompanying drawings, in which—

Figure 1 is a vertical central section through a wheel embodying my invention, and Figs. 2 and 3 are similar views with slight modifications.

A is a cast-metal hub.

B B are two sets of metallic spokes, preferably of gas-pipe, cast into the hub inclined toward each other in the usual way of making a wheel with staggered spokes, the spokes being also staggered on the rim of the wheel to a less degree.

The rim of the wheel is formed of two rolled metal tires C and D. The inner tire C is of smaller width and has spoke-sockets into which the outer ends of the spokes engage, projecting the whole thickness of said tire flush with the outer face thereof. The outer tire D, which is preferably flanged to form a suitable car-wheel flange E, is compressed or shrunk onto the inner tire and bears against the outer ends of the spokes. The inner tire is of suitable width to re-enforce the tread of the wheel and firmly hold the ends of the spokes against lateral displacement, and increased strength may be imparted to the wheel by rivet heading or upsetting the ends of the spokes in countersunk spoke-sockets, as shown in Fig. 2, or by an additional shoulder on the spokes, as shown in Fig. 3.

I do not specifically confine myself to make the flange of the wheel integral with the outer tire, but consider it optional to form the flange on either tire.

By forming the flange integral with the inner tire, as shown in Figs. 2 and 3, the advantage is obtained of forming the two tires of material of about the same width, or nearly so. In this latter modification a square shoulder F is formed on the flange, against which the outer tire abuts and forms a support for said flange.

The car-wheel flange is preferably re-enforced by folding over the edge of the flange to form the nosing G.

Aside from the simplicity and inherent strength of my construction, my wheel has several constructive advantages, as in constructing the mold of the hub the inner rim, being previously provided with spoke-sockets, may be laid on the follower-board and support the outer ends of the spokes in their particular relation to each other and to the hub, and if they should then happen to be of unequal length they may then be readily adjusted to become flush with the outer face of the inner rim, and thus insure a perfectly round wheel, provided the inner tire is perfectly round and laid concentrically with the hub. Then by shrinking or pressing on the outer tire the spokes, as well as the inner tire, are firmly held and bound together, with the outer tire in contact with the ends of the spokes, so that there is no possible chance for the wheel to sag and get out of round.

What I claim as my invention is—

1. A car-wheel consisting of a cast-metal hub, metal spokes cast into the said hub, an inner rolled tire provided with spoke-sockets, through which the outer ends of the metal spokes pass, and the outer rolled tire pressed or shrunk upon the inner tire and bearing against the outer ends of the spokes, and a flange formed integral with one of the tires, substantially as described.

2. A car-wheel consisting of a cast-metal hub, metal spokes cast into the hub, an inner rolled tire provided with spoke-sockets, through which the outer ends of the spokes pass and in which they are firmly secured, an outer tire upon the inner tire and bearing against the outer ends of the spokes, and a flange formed integral with one of the tires, substantially as described.

In testimony whereof I affix my signature in presence of two witnesses.

CYRUS ROBERTS.

Witnesses:
 M. B. O'DOGHERTY,
 GEO. A. GREGG.